United States Patent
Davidson, Jr. et al.

(10) Patent No.: US 10,250,353 B2
(45) Date of Patent: Apr. 2, 2019

(54) ELECTROMAGNETIC SIGNAL TRANSPORT AND DISTRIBUTION SYSTEMS

(71) Applicant: PERFECTVISION MANUFACTURING, INC., Little Rock, AR (US)

(72) Inventors: Charles Darwin Davidson, Jr., Little Rock, AR (US); William Lutz, Little Rock, AR (US)

(73) Assignee: PERFECTVISION MANUFACTURING, INC., Little Rock, AR (US)

( * ) Notice: Subject to any disclaimer, the term of this patent is extended or adjusted under 35 U.S.C. 154(b) by 0 days.

(21) Appl. No.: 15/613,391

(22) Filed: Jun. 5, 2017

(65) Prior Publication Data
US 2017/0272196 A1    Sep. 21, 2017

Related U.S. Application Data

(63) Continuation-in-part of application No. 14/937,596, filed on Nov. 10, 2015, now Pat. No. 9,806,844.

(60) Provisional application No. 62/077,370, filed on Nov. 10, 2014.

(51) Int. Cl.
| | |
|---|---|
| *H04B 10/2575* | (2013.01) |
| *H04J 14/02* | (2006.01) |
| *H04B 10/40* | (2013.01) |
| *H04B 1/18* | (2006.01) |
| *H04H 40/90* | (2008.01) |
| *H04B 10/25* | (2013.01) |

(52) U.S. Cl.
CPC ............ *H04J 14/023* (2013.01); *H04B 1/18* (2013.01); *H04B 10/2503* (2013.01); *H04B 10/25751* (2013.01); *H04B 10/25752* (2013.01); *H04B 10/25753* (2013.01); *H04B 10/25758* (2013.01); *H04B 10/40* (2013.01); *H04H 40/90* (2013.01); *H04J 14/0238* (2013.01); *H04J 14/0239* (2013.01); *H04J 14/0242* (2013.01); *H04J 14/0265* (2013.01)

(58) Field of Classification Search
CPC ..................... H04B 10/2575–10/2581; H04J 14/02–14/0252
USPC .................................. 398/66–101, 115–117
See application file for complete search history.

(56) References Cited

U.S. PATENT DOCUMENTS

| | | | | | |
|---|---|---|---|---|---|
| 5,644,622 | A * | 7/1997 | Russell | ............... | H04W 88/085 370/338 |
| 6,108,112 | A * | 8/2000 | Touma | .................. | H04B 10/07 398/1 |
| 6,718,553 | B2 * | 4/2004 | Kenworthy | ........ | H04N 7/17318 348/E7.071 |
| 8,699,881 | B1 * | 4/2014 | Iannone | ............. | H04J 14/0282 398/100 |
| 8,917,991 | B2 * | 12/2014 | Mysore | ............... | H04J 14/0226 398/68 |
| 2001/0030785 | A1 * | 10/2001 | Pangrac | .................. | H04N 7/22 398/72 |

(Continued)

*Primary Examiner* — Li Liu
(74) *Attorney, Agent, or Firm* — Paul D. Chancellor; Ocean Law

(57) ABSTRACT

An electromagnetic signal transport and distribution system simultaneously transports over one single mode fiber various programming specifically requested by multiple users in multiple locations while simultaneously offering bidirectional communications with a public network.

4 Claims, 10 Drawing Sheets

(56) References Cited

U.S. PATENT DOCUMENTS

| | | | | |
|---|---|---|---|---|
| 2002/0063924 A1* | 5/2002 | Kimbrough | H04B 10/272 | 398/79 |
| 2004/0022536 A1* | 2/2004 | Koh | H04B 10/272 | 398/41 |
| 2004/0057728 A1* | 3/2004 | Kim | H04B 10/1149 | 398/72 |
| 2005/0069318 A1* | 3/2005 | Lee | H04J 14/0226 | 398/67 |
| 2005/0138670 A1* | 6/2005 | Ploumen | H04J 14/02 | 725/118 |
| 2005/0172328 A1* | 8/2005 | Park | H04J 14/0226 | 725/129 |
| 2006/0020975 A1* | 1/2006 | Kenny | H04B 10/25751 | 725/63 |
| 2008/0304830 A1* | 12/2008 | Huang | H04J 14/0226 | 398/79 |
| 2010/0296156 A1* | 11/2010 | Buabbud | H04B 10/2918 | 359/341.2 |
| 2011/0283330 A1* | 11/2011 | Wang | H04B 1/18 | 725/69 |
| 2012/0087672 A1* | 4/2012 | Han | H04B 10/25754 | 398/115 |
| 2015/0131999 A1* | 5/2015 | Urban | H04B 10/40 | 398/76 |

\* cited by examiner

▲ Downstream
● Upstream

ELECTROMAGNETIC SIGNAL TRANSPORT AND DISTRIBUTION SYSTEMS

CROSS REFERENCE TO RELATED APPLICATIONS

This application is a continuation in part of U.S. patent application Ser. No. 14/937,596 filed Nov. 10, 2015 which claims the benefit of U.S. Provisional Pat. App. No. 62/077,370 filed Nov. 10, 2014 both of which are incorporated herein in their entireties and for all purposes.

BACKGROUND OF THE INVENTION

Field of the Invention

The invention relates to the field of electromagnetic signal transport and distribution. More particularly, the present invention relates to systems and methods for transporting and distributing signals in radio frequency and light portions of the electromagnetic spectrum.

Discussion of the Related Art

Electromagnetic signals are commonly transported in radio frequency and infrared portions of the electromagnetic spectrum. Transport media includes metallic cables for transporting radio frequency signals and fiber optic cables for transporting optical signals such as infrared signals.

Widespread use of fiber optic cables for long haul signal transport provides orders of magnitude more bandwidth over orders of magnitude longer distances as compared with copper cables such as a twisted pair of copper wires or coaxial cable. However, unlike long haul signal transport, signal distribution systems tend to be local to users and are more likely to use lower cost copper cabling given distribution bandwidth requirements typically do not require the capacity offered by fiber optic cables.

Fiber optic transmission, receiving, and conditioning equipment also represent a significant cost hurdle as compared with required metallic cable counterparts. For example, fiber optics transmit, amplify, receive, and split equipment costs for either of dense wavelength division multiplexing ("DWDM") equipment (e.g., 0.8 nm channel spacing) or coarse wavelength division multiplexing ("CWDM") equipment (e.g., 20 nm channel spacing) far exceed the costs of counterpart equipment required for twisted pair and coaxial cable signals.

Converting signals from mixed transport media into a common format usable at signal end points is a problem that is multiplied by an abundance of signal sources in multiple locations which may be near signal end point (e.g., "within sight") or far from the signal end point (e.g., kilometers/miles away).

Signal transport and distribution systems that readily accommodate geographically diverse signals carried on multiple transport media while delivering a usable signal(s) at a signal end point or multiple signal end points are rare, especially in commercial, dwelling unit, and multi-dwelling unit applications where the cost of sophisticated signal handling equipment is prohibitive.

SUMMARY OF THE INVENTION

A signal transport-distribution system and method aggregates and delivers multiple signals to multiple signal end points. In an embodiment a signal transport and distribution system serving users with internet and satellite television services, comprises: in a multi-dwelling building, a roof mounted DBS end, a weather protected dispatch block, and a user end; the dispatch block interconnecting the DBS end and the user end; an internet service provider passive optical network interconnected with an OLT of the dispatch block; in the dispatch block, a switch for receiving DBS signals via plural coaxial cables interconnected with a DBS low noise block, the switch configured to simultaneously deliver multiple channels of multimedia content at a switch coaxial output port in response to requests received from a plurality of set top boxes, a splitter with "y" output ports coupling the switch coaxial output to each of "y" dispatch block transceivers; in each of "y" dwelling units, a dwelling unit transceiver having a coaxial output port and an optical input and output port, a coaxial cable interconnecting the dwelling unit transceiver and a single or multi-tuner set top box, an optical cable interconnecting the dwelling unit transceiver and an ONU; and, for each dispatch block transceiver, a single mode fiber optic cable interconnecting the transceiver with a respective dwelling unit transceiver; wherein dwelling units simultaneously receive content of their choice as requested via their respective set top boxes and simultaneously exchange data with a public network.

In some embodiments each of the dispatch block and dwelling unit transceiver pairs utilizes diplexers to route bidirectional control signals exchanged between an associated set top box and the switch.

And, in some embodiments each of the dispatch block and dwelling unit transceiver pairs utilizes bidirectional filters or telephone hybrid transformers to route control signals exchanged between an associated set top box and the switch.

DETAILED DESCRIPTION OF THE PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

This application incorporates by reference, in its entirety and for all purposes, ANSI/SCTE 174 2010 Radio Frequency over Glass Fiber-to-the-Home Specification (American National Standards Institute; Society of Cable Telecommunications Engineers). This application incorporates by reference, in their entireties and for all purposes, IEEE standards including IEEE 802.3, IEEE 802.3 ah, IEEE 802.3 ah-2004, and IEEE 802.3av (Institute of Electrical & Electronics Engineers).

Figure 1A:
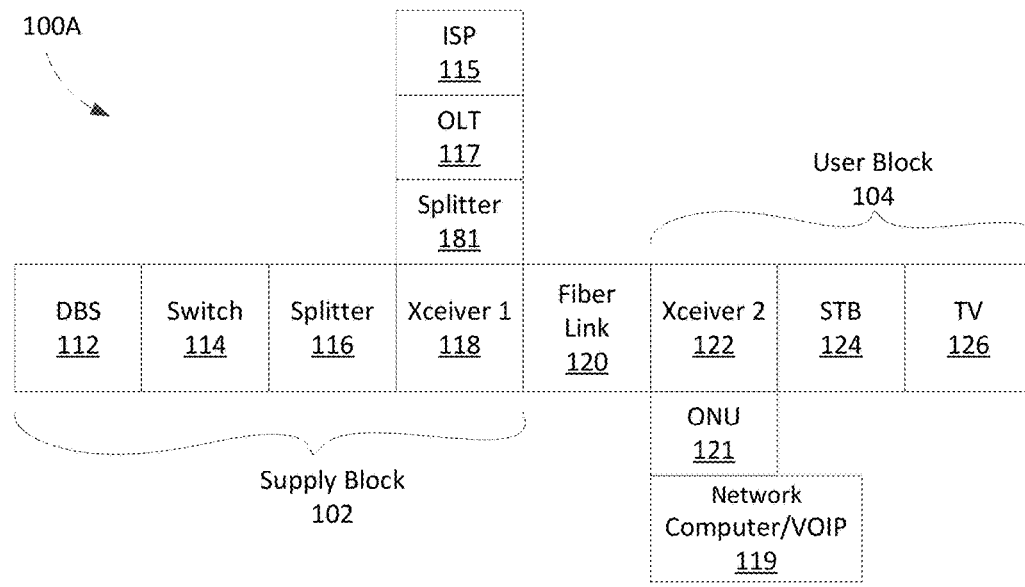
FIG. 1A shows first block diagram of a system in accordance with the current invention.

FIG. 1A is a block diagram 100A illustrating a signal transport and distribution system in accordance with the present invention. As discussed below, signals in this system are transported via metallic conductors such as copper, for example via coaxial cables, and via fiber.

In the diagram, a supply block 102 including a first transceiver 118 is linked with a user block 104 including a second transceiver 122 via a single mode fiber optic cable 120. The first transceiver 118 exchanges optical signals (e.g., single mode fiber optic media) with a first source such as an internet service provider ("ISP") 115 via an optical line terminal ("OLT") 117. In some embodiments a splitter 181 is interposed between the transceiver 118 and the OLT 117. OLT functions include bidirectional control of information across an optical distribution network ("ODN"). The OLT may, for example, be located in a main distribution frame ("MDF"), an intermediate distribution ("IDF"), or a central office.

The first transceiver 118 also exchanges electrical signals (e.g., coaxial cable media) with a second source, for example with a video source such as a direct broadcast satellite ("DBS") source 112. Notably, a DBS source may provide multiple channels where individual channels and/or groups of channels are received by a set top box that delivers a multimedia presentation (e.g., movies and television shows to a TV). In various embodiments, a set top box may request a particular channel or group of channels via communicating with a switch 114. The switch may be interposed between the DBS and the first transceiver.

Signals from the DBS source 112 may be processed by a switch 114 (e.g. single wire multiswitch, "SWM") providing a plurality of frequency bands. Signals from the switch may be split or not via an electrical signal splitter 116. For example, where a switch provides "n" frequency bands, the splitter may make these frequency bands available to multiple set top boxes as discussed below. For convenience, the first transceiver 118 may be referred to herein as a transmitter because it forwards video and internet signals.

The second transceiver 122 exchanges electrical signals with appliances such as a television ("TV") 126 via a set top box 124 ("STB"). The second transceiver also exchanges optical signals with a network such as a local area network and/or appliances such computer(s) and voice over internet protocol ("VOIP") devices 119 via an optical network unit ("ONU") 121. ONU functions include conversion of optical signals transmitted via fiber to electrical signals. The ONU may send, aggregate and groom different types of data coming from an appliance and send it upstream to the OLT. For convenience, this second transceiver 122 may, as the receiver of transmitted video and internet signals, be referred to as a receiver.

Figure 1B:
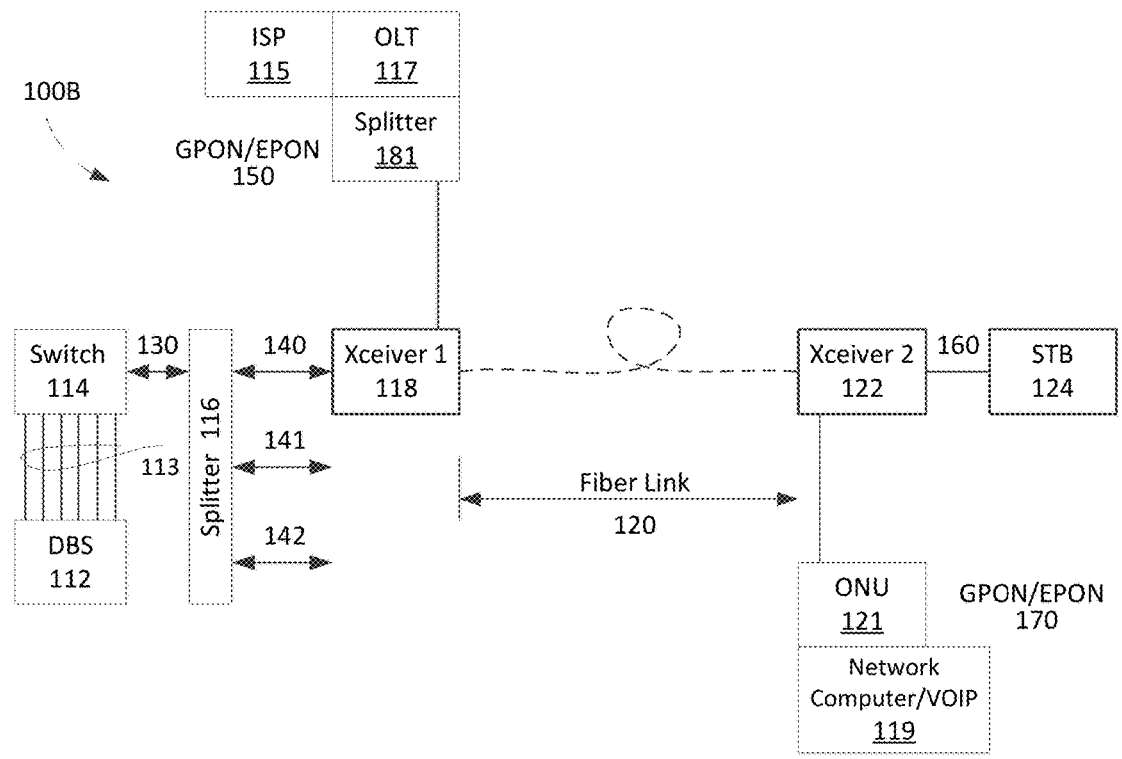
FIG. 1B shows a second block diagram based on the system of FIG. 1A.

FIG. 1B shows an embodiment 100B of the block diagram of FIG. 1. As seen, a supply block 102 including a first transceiver 118 is linked with a user block 104 including a second transceiver 122 via a fiber link 120. In some embodiments, the fiber link is a single mode fiber optic cable.

In the supply block, the first transceiver 118 exchanges GPON/EPON optical signals with an internet service provider ("ISP") 115 via an optical line terminal ("OLT") 117 and in some embodiments via a splitter 181. Signals between the first transceiver and the OLT are transported via a fiber optic cable 150. The first transceiver 118 also exchanges electrical signals with a DBS source 112.

Between the DBS source and the transceiver is a switching device 114 followed by a signal splitter 116. One or more coaxial cables 113 transport DBS signals (e.g., from a satellite dish low noise block "LNB") to the switch. In response to signals received from the set top box 124, the switch responds by transmitting requested DBS channel(s) over a coaxial cable 130 to the splitter 116. One splitter port 140 of multiple splitter ports 140-142 forwards the requested channel(s) to the transmitter 118.

In the user block, the second transceiver 122 exchanges electrical signals with a set top box STB 124 via a coaxial cable 160. The second transceiver also exchanges GPON/EPON signals with an ONU 121 via a fiber optic cable 170. As mentioned above, appliances such as computer(s) and voice over internet protocol ("VOIP") device(s) 119 are supported by the ONU.

Figure 1C:
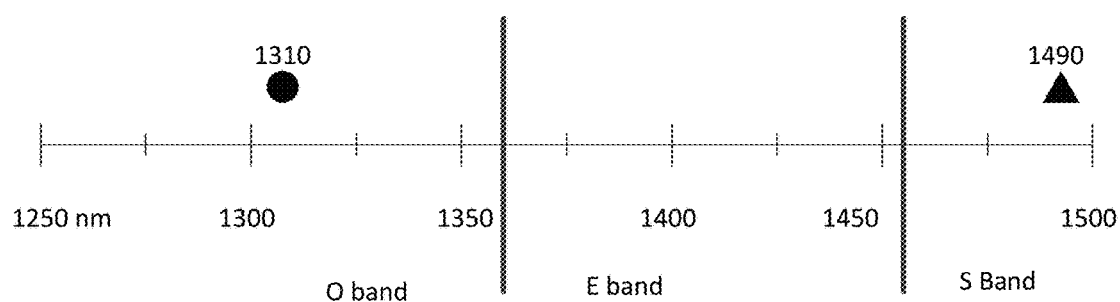
FIGS. 1C-D show wavelengths and frequencies used by various embodiments of FIG. 1A.
Figure 1C:
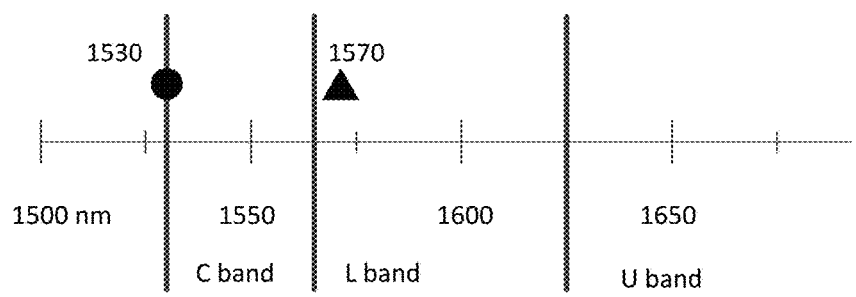

FIG. 1C shows a wavelength allocation chart for optical media communications 100C. Some embodiments of the invention transmit and/or receive GPON and/or EPON signals utilizing O band, S band and C band communication. Some embodiments utilize C and/or S band communications for upstream communication of control signals. Some embodiments utilize L band for downstream communication of video and/or control signals. In an embodiment, 1490/1550 and 1310 nm wavelengths are used for downstream and upstream communication of EPON/GPON signals. In an embodiment 1570/1590 nm wavelength is used for downstream communication of control and/or video signals. In an embodiment 1530 nm wavelength is used for upstream communication of control signals.

Figure 1D:
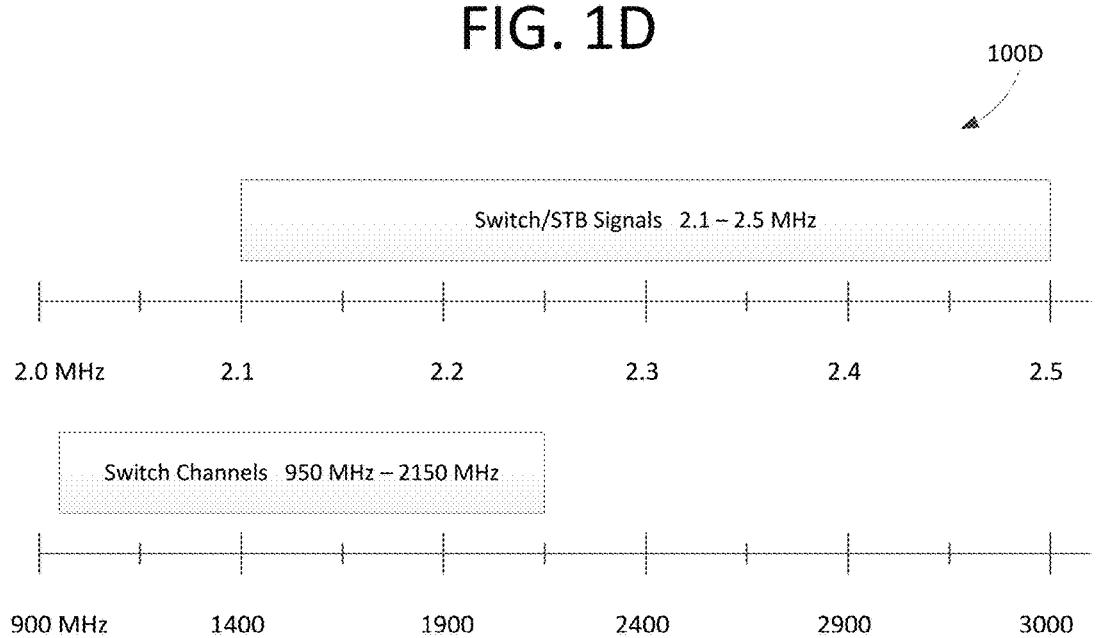

FIG. 1D shows a frequency allocation chart for electrical media communications 100D. Some embodiments of the invention provide for exchanging signals such as FSK signals between the switch 114 and the set top box 124 using frequencies in the range of 2.1-2.5 MHz, for example 2.25 Mhz. Some embodiments of the invention provide for transporting switch channels using frequencies in the range of 950-2150 MHz.

Figure 2A:
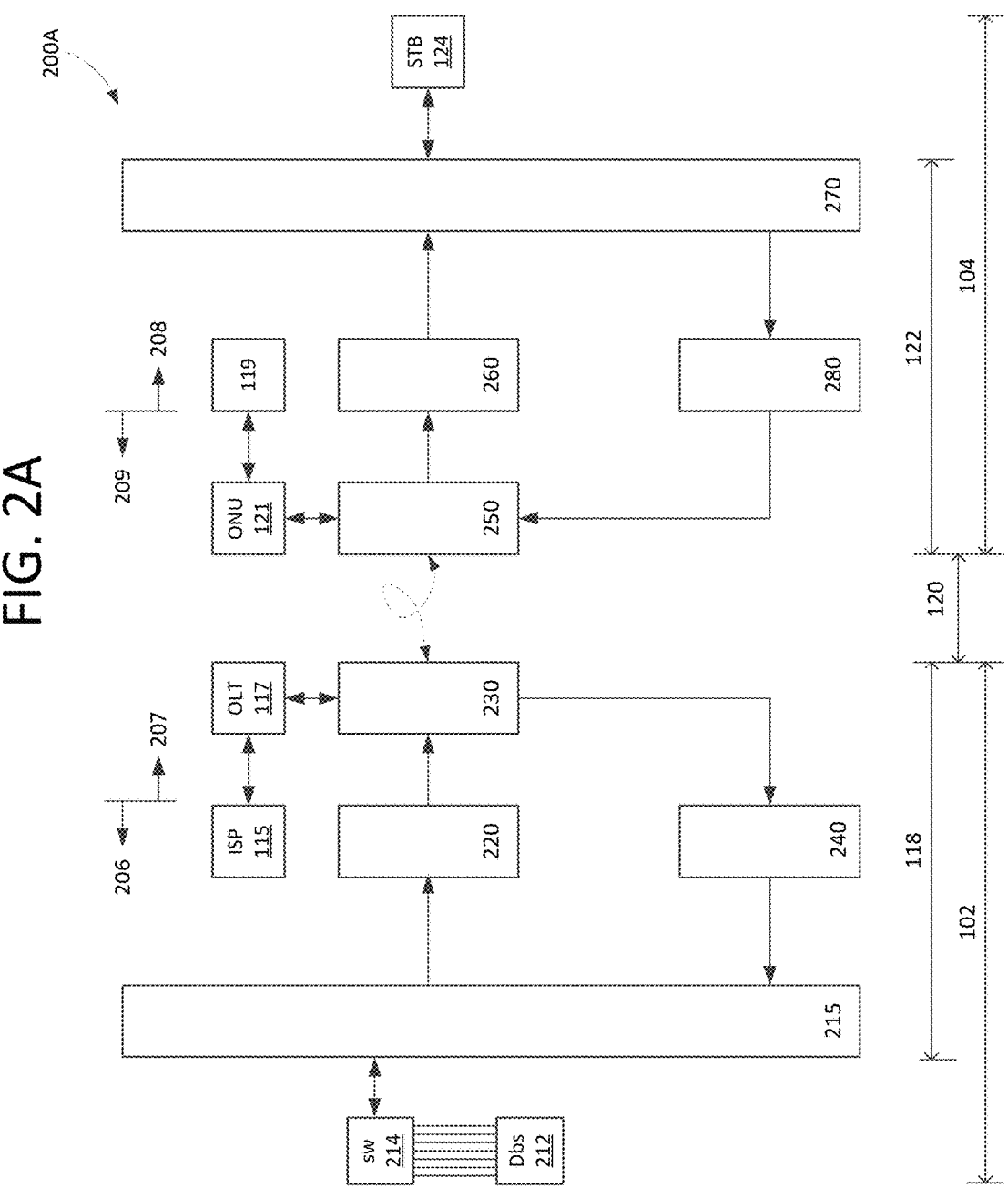
FIGS. 2A-C show details of transceivers used in the system of FIG. 1A.

FIG. 2A shows an embodiment 200A of the signal transport and distribution system of FIG. 1.

In the figure, a supply block 102 includes a first transceiver 118 and a user block 104 includes a second transceiver 122. The first transceiver has an electrical section 206 and an optical section 207. The second transceiver has an electrical section 208 and an optical section 209.

In the supply block 102, an input signal amplifier 215 exchanges signals with a DBS source 212 via a switch 214. The amplifier has an output to an electrical to optical converter (E/O converter) 220 and an input from an optical to electrical converter (O/E converter) 240.

A first transceiver optical multiplexer 230 has a bidirectional connection with a fiber optic cable such as a single mode fiber optic cable 120. The multiplexor receives a signal from the E/O converter 220 and sends a signal to the O/E converter 240. In addition, the multiplexor exchanges signals with an ISP 115 via an OLT 117. Notably, the optical multiplexor 230 is actually a multiplexer/demultiplexer. For convenience, this device is referred to as a multiplexer which is consistent with its role in multiplexing downstream signals.

In the user block 104, an optical demultiplexer 250 has a bidirectional connection with the fiber optic cable 120. In addition, the demultiplexer has an output to an O/E converter 260, an input from an E/O converter 280, and a bidirectional port that connects with an appliance 119 via an ONU 121. Notably, the optical demultiplexer 250 is actually a multiplexer/demultiplexer. For convenience, this device is referred to as a demultiplexer which is consistent with its role in demultiplexing downstream signals.

An input amplifier 270 has a bidirectional connection with a set top box. In addition the amplifier receives a signal from the O/E Converter 260 and outputs a signal to the optical demultiplexer 250 via a E/O converter 280.

Figure 2B:
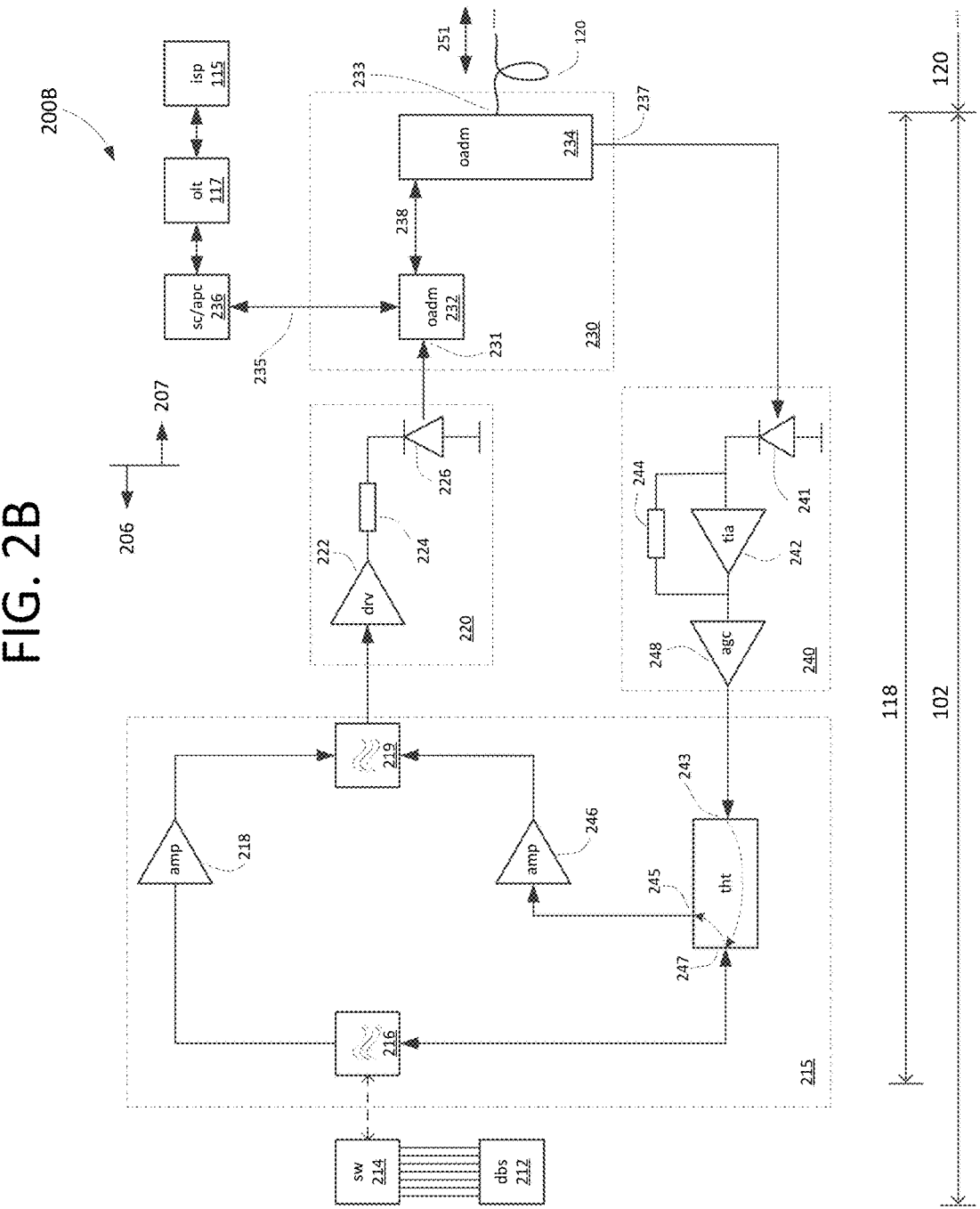
Figure 2C:
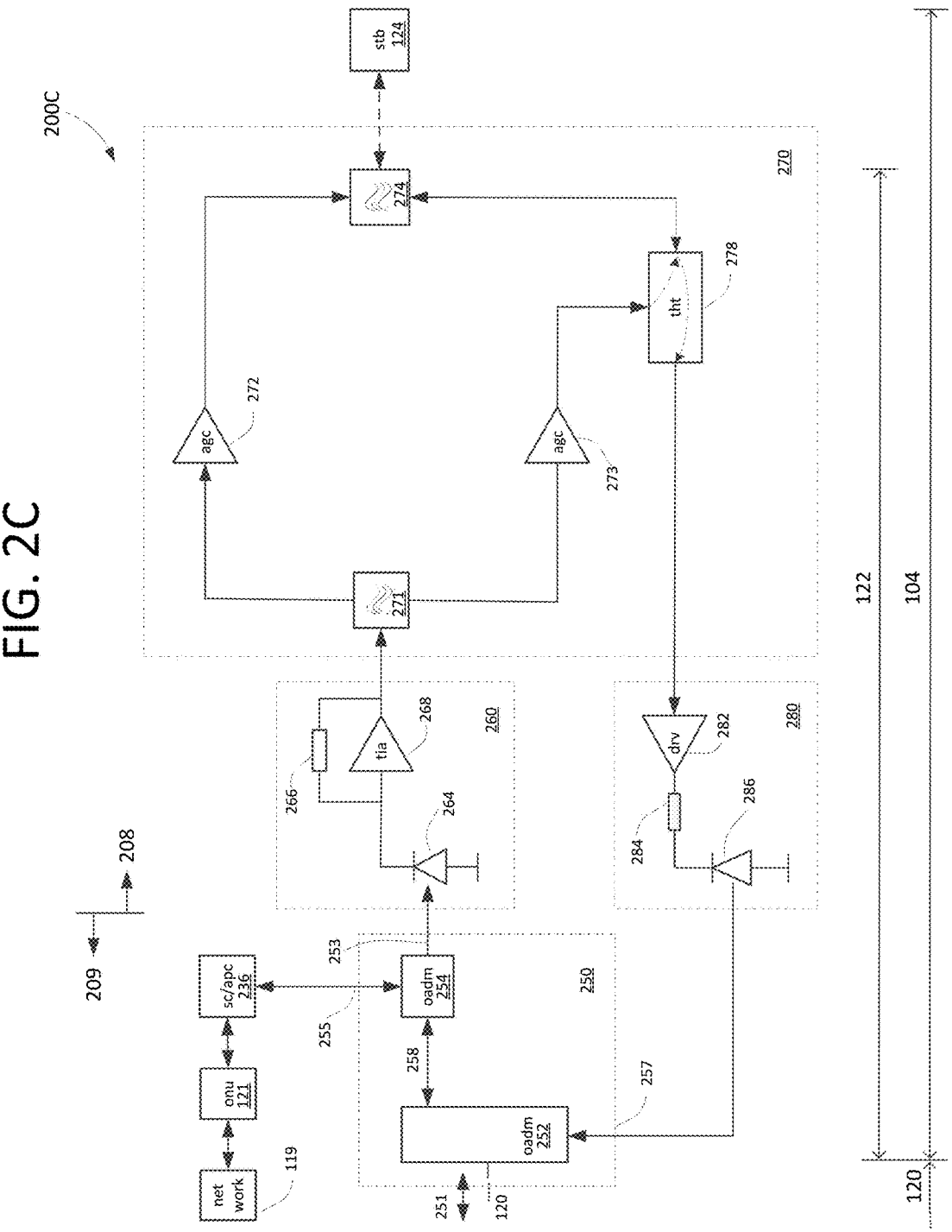

FIGS. 2B-C show an embodiment 200B-C of the signal transport and distribution system of FIG. 1.

In FIG. 2B, a supply block 102 interconnects with a bidirectional 251 fiber optic cable 120.

Within the supply block 102 a detailed implementation of the first transceiver 118 is shown. The transceiver may be described as having an electrical signal section 206 and an optical signal section 207.

The electrical signal section 206 includes an input signal amplifier 215 for exchanging signals with the switch 214 and driving a laser 226 (e.g. 1570 DFB laser operating at 1563-1577 nm). A laser driving circuit 220 may include a driver amplifier 222 in series with a dropping resistor 224.

The input signal amplifier 215 provides for receiving a multiband signal from the switch 214 and amplifying the signal. In an embodiment, a first diplexer 216 i) receives video and STB signals (e.g., control and/or FSK control signals) from the switch 214 over a single coaxial cable 140, ii) outputs the video signal to a video signal amplifier 218, and iii) outputs the control signal to an control signal amplifier 246 via a signal director 249 (e.g., a telephone hybrid transformer). In a second diplexer 219, the amplified video and control signals are recombined for driving the laser 226 as by the laser driving circuit 220.

The input signal amplifier 215 also provides for receiving a control signal from the STB 124. In particular, the signal director may provide an input port 243, an output port 245, and a bi-directional port 247. The output port may be used for transporting control signals originating from the switch 214 as described above. The bi-directional port 247 may be used for transporting control signals from the STB 124 to the switch.

The method of directing signals can be achieved through the use of a telephone hybrid transformer, as discussed above, or by utilizing radio frequency designs that deliver appropriate signals to the appropriate ports based on the frequencies used in the application and the amount of signal needed to perform the function.

A photodetector such as photodiode or PIN diode 241 excited by an STB signal may be coupled with the signal director input port 243 via an optical to electrical converter ("O/E converter") 240. For example, a PIN diode output may be coupled with the signal director input port 243 via a transimpedance amplifier 242 with attenuated feedback 244 driving an automatic gain control 248.

Signals from the electrical section 206 are passed to the optical section 207 via an optical multiplexer 230. In particular, the optical multiplexer includes an input port 231, an output port 237 and two bidirectional ports 233, 235. In an embodiment, the multiplexer includes first and second optical add drop multiplexers ("OADM") 232, 234 coupled via a bidirectional link 238. The first multiplexer 232 includes the input port 231 and the bidirectional port 235. The second multiplexer 234 includes the output port 237 and the bidirectional port 233.

Notably, optical multiplexing can be achieved by several technologies that have relative benefits depending upon production concerns, quality, cost, supply, and/or application. Examples of these technologies include CWDM (coarse wavelength division multiplexing) and DWDM (dense wavelength division multiplexing), OADM (optical add-drop multiplexors), and BOSA (Bidirectional Optical Sub-Assemblies). In addition, these technologies can be used in a series arrangement as described earlier. All of these technologies can be used to multiplex (i.e. combine) and de-multiplex (i.e. separate) wavelengths onto the same fiber cable in opposite directions (i.e. bidirectional).

The laser diode 226 transmits video and control signals from the electrical section 206 to the input port 231 and the multiplexer passes these signals to the fiber link 120 which is attached to the first bidirectional port 233. Optical connections such as unidirectional and bidirectional port connections may utilize an optical connector such as an sc/apc optical connector 236.

Optical network signals such as GPON/EPON signals 235 exchanged with an ISP 115 via an OLT 117 also pass through the optical multiplexer 230 via the second bidirectional port 235.

As mentioned above and as is further described below, the optical multiplexer 230 also receives signals from the second transceiver 122. In particular, signals from the second transceiver enter the multiplexer 230 from the fiber link 120 at the first bidirectional port 233. These signals may include control signals from the set top box 124 and optical network signals such as EPON/GPON signals passed to the second transceiver from various appliances 119 via an ONU 121. The optical multiplexer 230 segregates these signals such that EPON/GPON signals are exchanged via the second bidirectional port 235 and control signals via the output port 237 excite the first transceiver PIN diode 241.

While the optical section including block 230 and in cases photodiode 226 and photodetector 241 has been implemented using OADM's, this is, as mentioned, but one of several methods. For example, a bidirectional optical sub-assembly ("BOSA") might be used having a fiber optic connection, a receiver optical connection ("ROSA") and a transmitter optical connection ("TOSA") for the GPON/EPON signals, a transmitter optical connection for the for the video and control signals ("ROSA") and a receiver optical connection for the control signals ("TOSA").

In FIG. 2C, a user block 104 interconnects with the fiber link 120.

Within the user block 104 a detailed implementation of the second transceiver 122 is shown. The transceiver may be described as having an optical signal section 209 and an electrical signal section 208.

The optical signal section 209 includes a receiver demultiplexer 250 with an input port 257, a first bidirectional 251 fiber optic link 120, an electrical section output port 253, and a second bidirectional port 255. In an embodiment, the demultiplexer includes first and second optical add drop multiplexers ("OADM") 252, 254 coupled via a bidirectional link 258. The first multiplexer includes the first bidirectional output port 251 and the input port 257. The second multiplexer includes the output port 253 and the second bidirectional port 255.

Optical network signals such as GPON/EPON signals 259 exchanged with user appliances 119 via an ONU 121 also pass through the receiver demultiplexer 250 via the bidirectional port 255.

The electrical signal section 208 includes an output signal amplifier 270 for exchanging signals between a PIN diode 264 and the set top box 124. The amplifier is driven by an optical to electrical converter ("O/E converter") 260 including the PIN diode and the PIN diode is driven by the demultiplexer electrical section output port 253. The O/E converter circuit may include a serially arranged transimpedance amplifier 268 with attenuated feedback 266.

In the output signal amplifier 270, a first diplexer 271 is driven by the O/E converter circuit 260. Diplexer outputs drive respective automatic gain control ("AGC") amplifiers. A first of the amplifiers 272 receives a video output from the first diplexer and forwards an amplified video signal to second diplexer 274. A second of the amplifiers 273 receives a control output from the first diplexer and forwards the amplified control signal to the second diplexer 274 via a signal director 278 (e.g., a telephone hybrid transformer). The set top box 124 receives a diplexed video/control signal via the second diplexer.

As mentioned earlier, STB control signals such as FSK signals may be passed over the fiber link 120. In particular, a control signal entering the second diplexer 274 may be forwarded to an electrical to optical conversion block ("E/O block") 280 via the signal director 278. A laser diode 286 within the E/O block transfers the signal to the fiber link via the receiver demultiplexer 250 and its input port 257. In an embodiment, the E/O block includes a driver 282 in series with the laser diode 286 and in some embodiments the driver output is attenuated 284.

While the optical section including block 230 and in cases photodiode 226 and photodetector 241 has been implemented using OADM's, this is, as mentioned, but one of several methods. For example, a bidirectional optical subassembly ("BOSA") might be used that includes a fiber optic connection, a receiver optical connection ("ROSA") and a transmitter optical connection ("TOSA") for the GPON/EPON signals, a receiver optical connection for the for the video and control signals ("ROSA") and a transmitter optical connection for the control signals ("TOSA").

Figure 3A:
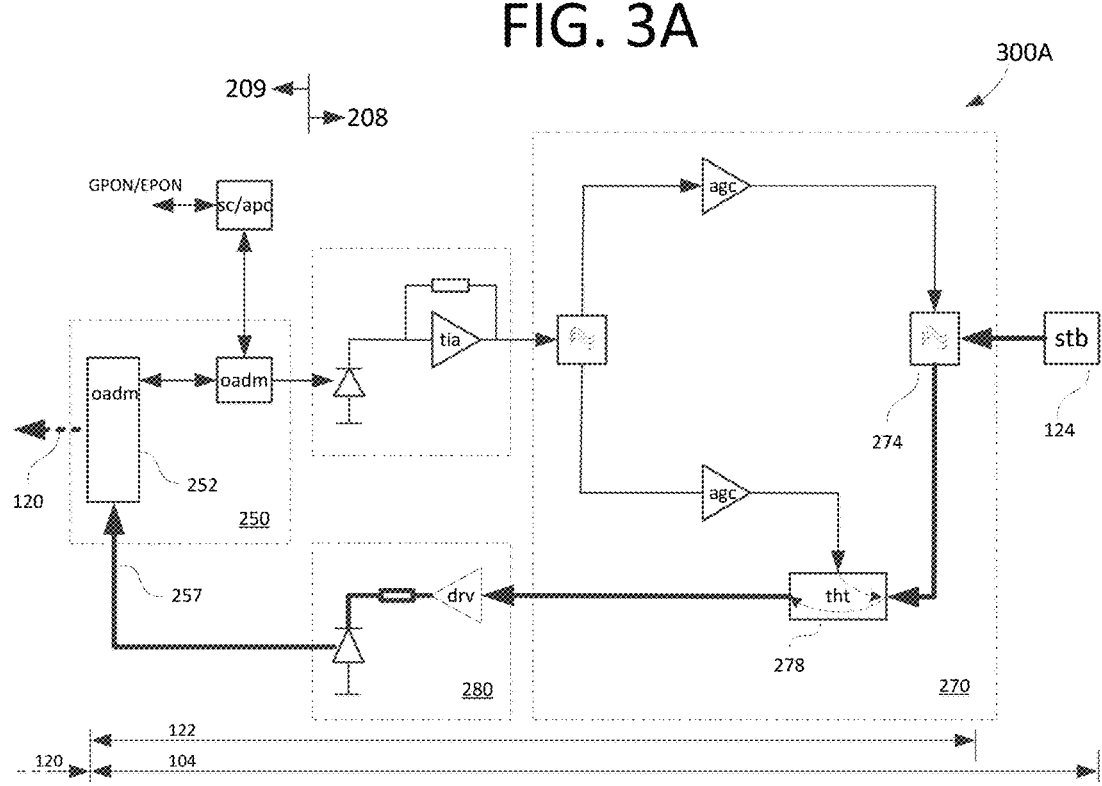
FIGS. 3A-B show signal flows related to set top box requests in an embodiment of the system of FIG. 1A.
Figure 3B:
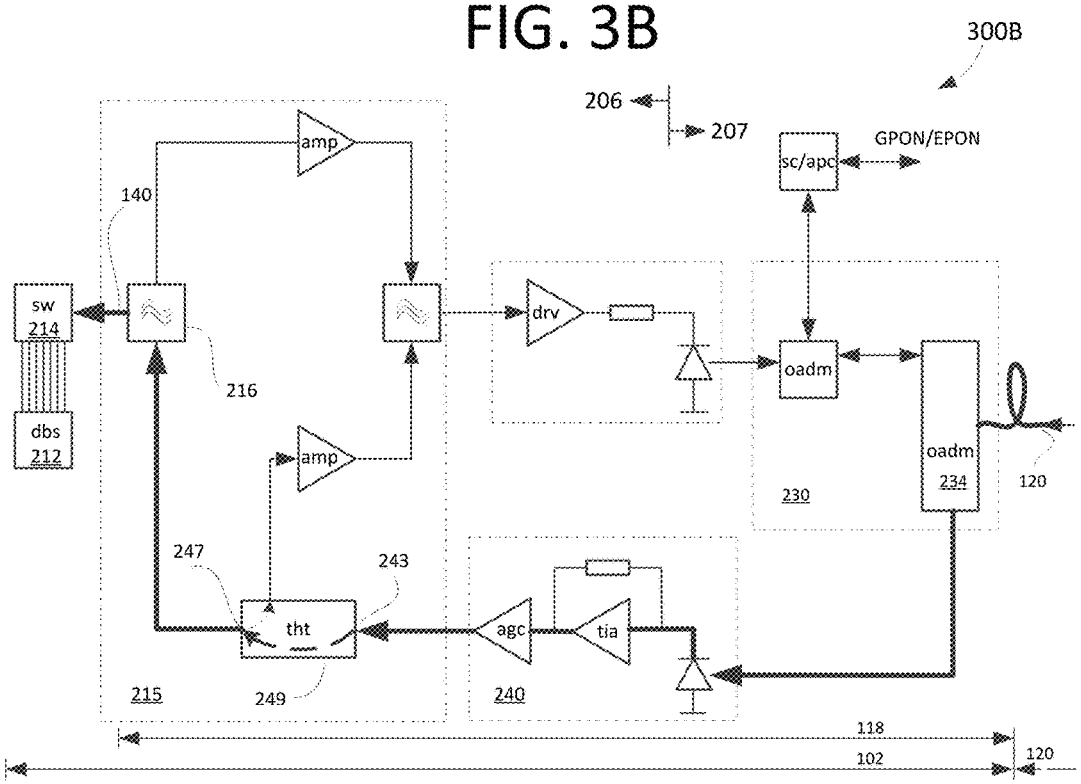

FIGS. 3A-B show transport of a signal originating at a set top box 300A-B. Here, a signal such as a control signal originates at a set top box 124 and carries an instruction to a switch 214. In the second transceiver, the second diplexer 274 segregates high and low frequency signals such that relatively low frequency control signal from the STB is routed to the signal director 278. In turn, the signal director routs the control signal to the E/O converter 280. Receiving the E/O optical output, the optical demultiplexer 250 passes the signal to the fiber link 120 that interconnects the first 118 and second 122 transceivers.

In the first transceiver 118, the multiplexor 230 receives the signal from the fiber link 120 and passes the signal to the O/E converter 240. The signal director 249 receives the signal from the O/E converter and routs the signal to the first diplexer 216 which routs the signal to the switch 214 via a coaxial cable 140.

Figure 4A:
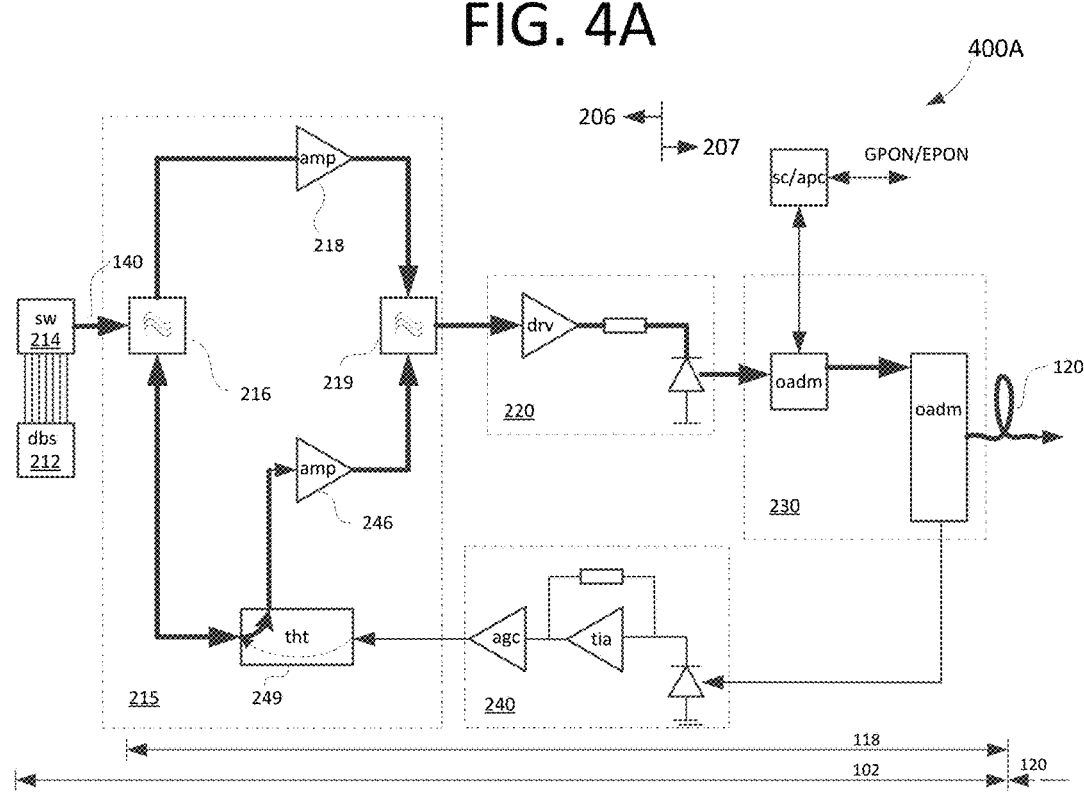
FIGS. 4A-B show signal flows related to downstream propagation of video and control signals used with an embodiment of the system of FIG. 1A.
Figure 4B:
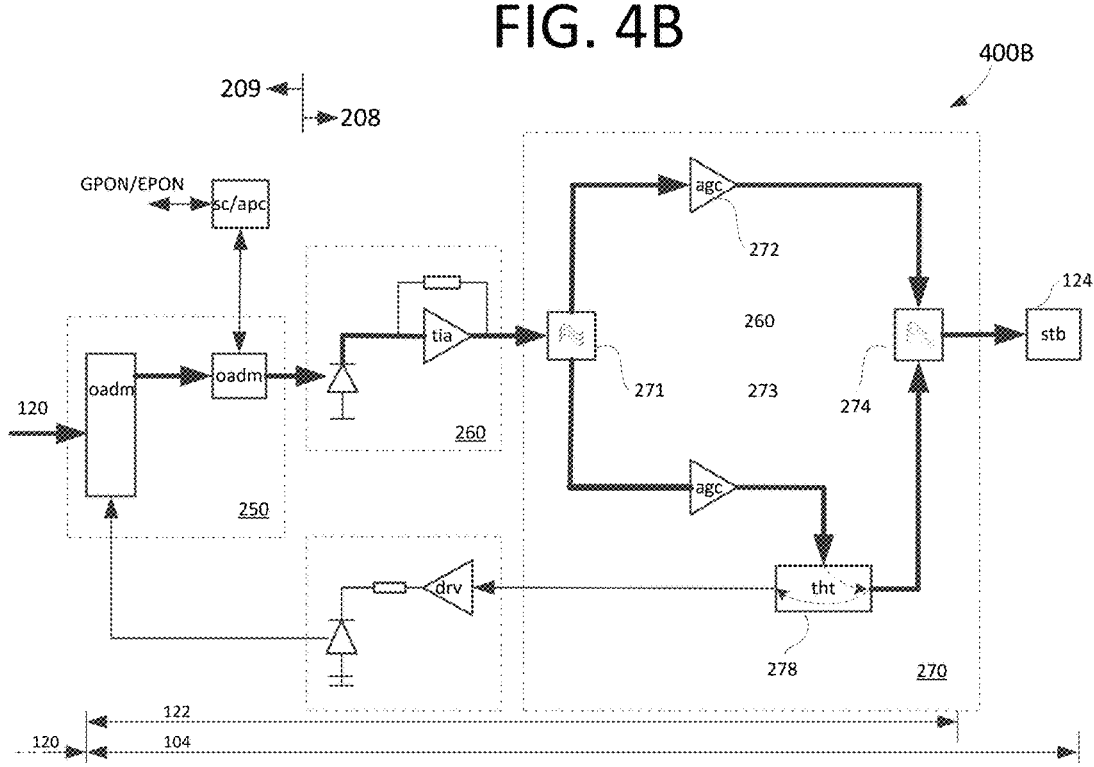

FIGS. 4A-B show transport of control and video signals 400A-B. Here, i) a control signal originates at the switch and ii) a video signal originates at the switch. In the first transceiver, a first diplexer 216 receives a signal from the switch 214 via a coaxial cable 140.

The first diplexer segregates the signal into i) a relatively high frequency video signal and ii) a relatively low frequency control signal. The first diplexer routes the video signal to a second diplexer 219 via an amplifier 218 and routes the control signal to a signal director 249. In turn, the signal director routes the control signal to the second diplexer via an amplifier 246.

A diplexed control and video signal is passed from the second diplexer 219 to a multiplexer 230 via an electrical to optical converter 220. The diplexed signal reaches a fiber link 120 interconnecting the first 118 and second 122 transceivers via the multiplexer.

In the second transceiver 122, a demultiplexer 250 receives the diplexed signal from the fiber link 120 and passes it to first diplexer 271 via an O/E converter 260. The first diplexer segregates the signal into i) a relatively high frequency video signal and ii) a relatively low frequency control signal.

The first diplexer i) routes the video signal to a second diplexer 274 via a first automatic gain control 272 and ii) routes the control signal to a signal director 278 via a second automatic gain control 273. The signal director routs the control signal to the second diplexer 274. The diplexed signal reaches the set top box 124 via a coaxial cable 160.

Figure 5A:
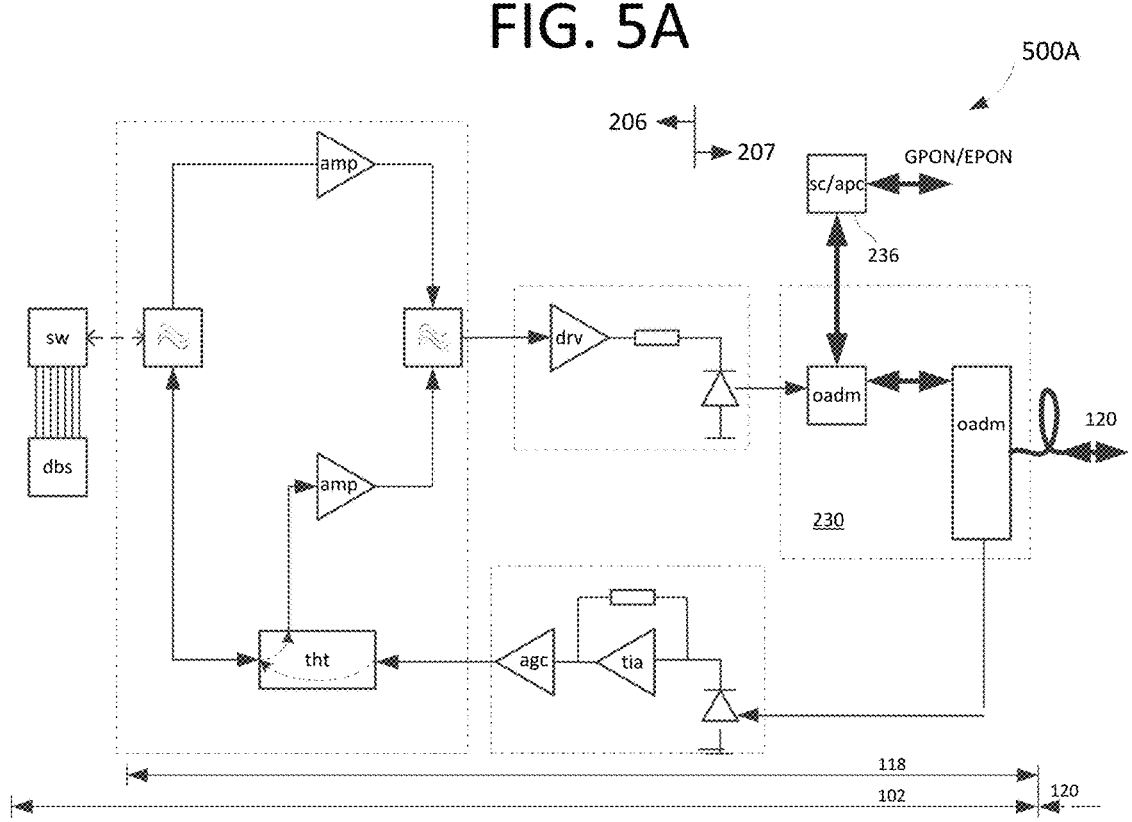
FIGS. 5A-B show signal flows related to external network communications used with an embodiment of the system of FIG. 1A.
Figure 5B:
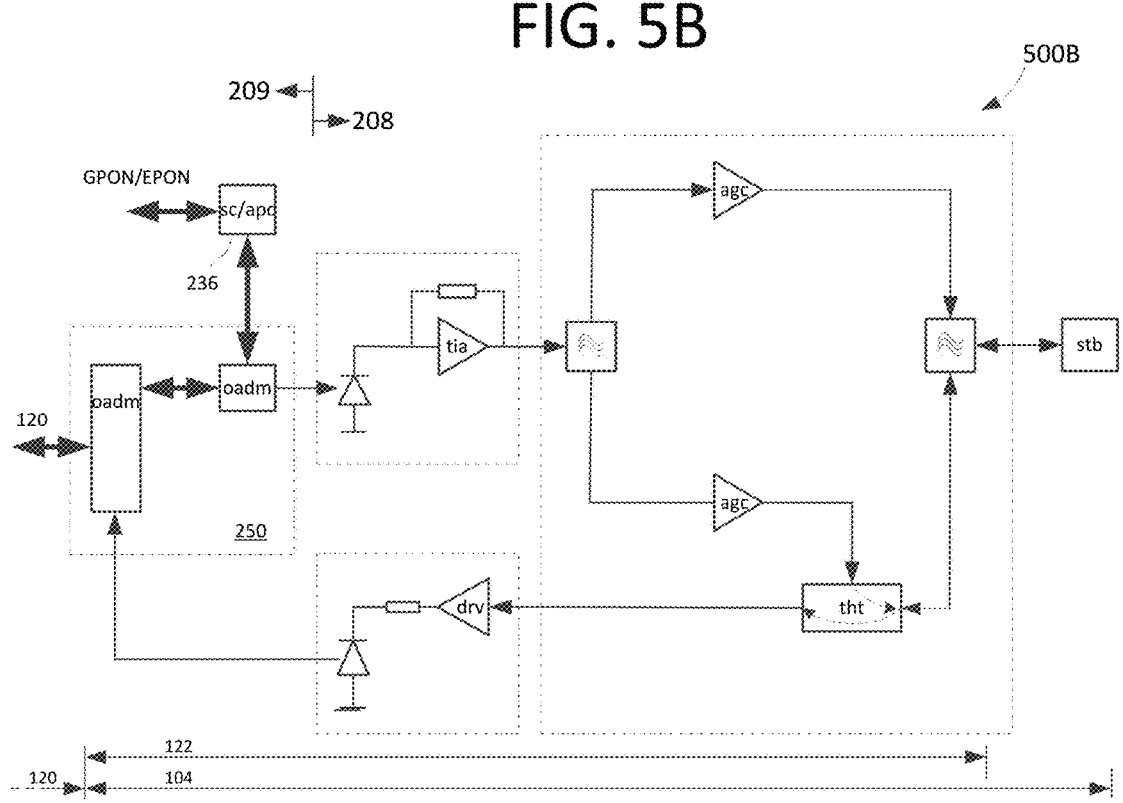

FIGS. 5A-B show transport of bidirectional GPON/EPON signals 500A-B. Here, bidirectional signals are transported between an OLT 117 and an ONU 121. For example, signals originating at the OLT 117 are transported to a bidirectional port of the multiplexer 230 in the first transceiver 118. Via the fiber link 120 interconnecting the first 118 and second 122 transceivers, the signal is passed to a demultiplexer 250 in the second transceiver. An ONU 121 coupled to a demultiplexer bidirectional port provides for interconnection of appliances seeking to communicate with the network 239. For example, signals originating at the ONU 121 pass through a bidirectional port of the demultiplexer 250, then via the fiber link 120 interconnecting the first 118 and second 122 transceivers, and to the OLT 117 via a bidirectional port on the multiplexor 230.

Figure 6:
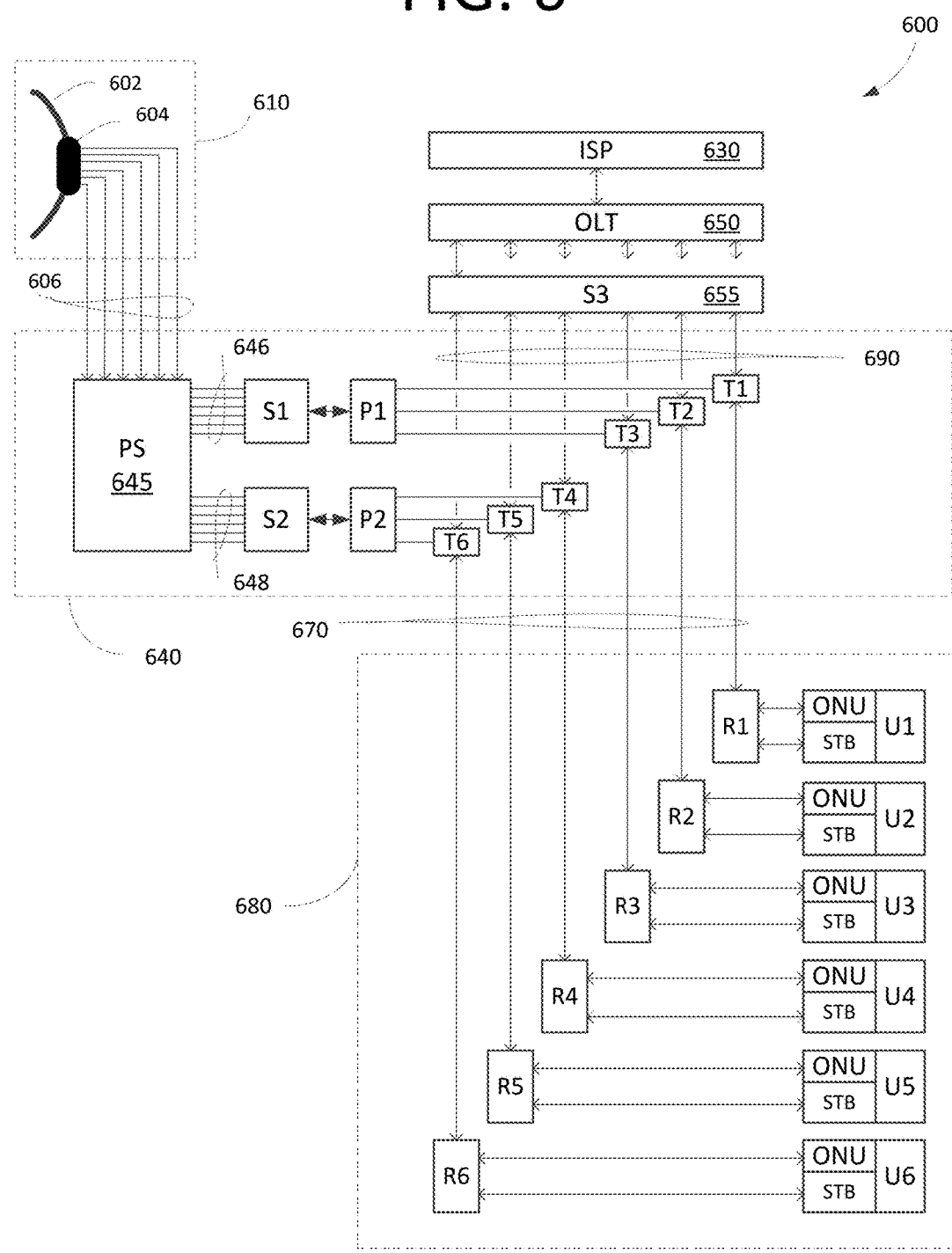
FIG. 6 shows an application of an embodiment of the system of FIG. 1A.

FIG. 6 shows an electromagnetic signal transport and distribution system that employs an embodiment of the invention 600. The system includes a DBS end 610 and a user end 680. Interconnecting the DBS end and the user end is a dispatch block 640 and interconnecting with the dispatch block is a network 630 such as a network operated by an ISP.

In the DBS end 610, a direct broadcast satellite ("DBS") receiving subsystem includes a satellite dish 602, a low noise block converter ("LNB") 604 with one or more coaxial cable interconnections 606.

Connecting with the DBS end 610 is the dispatch block 640. The dispatch block includes one or more switches (e.g., "n" switches) and each switch includes a plurality of frequency blocks (e.g., "x" frequency blocks per switch). Each switch receives signal(s) from the dish. As shown, the LNB signals are carried by coaxial cables 606 and enter a tap or splitter 645 which feeds each to two switches S1 and S2 with respective signals 646, 648.

Switch S1 has a single coaxial output coupled with a splitter P1 and switch S2 has a single coaxial output coupled with a splitter P2. These splitters P1, P2 provide each of multiple end users or dwelling units with access to the frequency blocks within the interconnected switch. Various embodiments provide set top boxes 124 configured to access particular ones of the frequency blocks such that a frequency block or groups of frequency blocks available from each switch is/are allocated to particular set top boxes. For example, if a switch S1 has x=15 frequency blocks and a connected splitter P1 has y=3 ports, then the three way splitter shown P1 provides each port, user, or dwelling unit with access to the frequency blocks.

In an embodiment, the LNB 604 and a switch S1 are packaged together. In this case, a single coaxial output can be coupled to a splitter P1 to provide multiple end users or dwelling units with access to the frequency blocks within the interconnected switch.

In various embodiments a switch S1 allocates particular frequency blocks to each set top box. For example, where groups of frequency blocks are allocated to each of three set top boxes interconnected with the splitter ports, the first STB may have access to frequency blocks 1-5, the second STB may have access to frequency blocks 6-10, and the third STB may have access to frequency blocks 11-15. In this example of equally allocated frequency blocks, each STB is allocated (x/y) frequency blocks from an interconnected switch.

As shown, each of the splitter output ports is interconnected via coaxial cable with a respective transceiver. As shown splitter P1 is connected with transceivers T1, T2, T3 and splitter P2 is connected with transceivers T4, T5, T6. And, as shown, each of the transceivers is connected with an ISP 630 via an optical splitter 655, and an OLT 650. The connections between the optical splitter and the transmitter 690 are fiber connections as are the connections from the splitter to the OLT and from the OLT to the ISP.

Transport is via single mode fiber links. In particular, fiber optic cables 670 interconnect each of the transceivers with respective second transceivers R1, R2, R3 and R4, R5, R6 located in respective units U1, U2, U3 and U4, U5, U6 in user end 680.

Coaxial cable ports on the second transceivers R1, R2, R3 and R4, R5, R6 interconnect with respective set top boxes located in each of the units U1-U6. Fiber optic ports on the second transceivers interconnect with respective optical devices such as with respective ONU's.

In an embodiment the transceivers R1-R6 are included in the ONU. In an embodiment the transceivers are included in the set top box. In an embodiment the transceivers, the set top box, and the ONU are included in a common package.

In some embodiments, the DBS end 610 is roof mounted on a multi-dwelling building roof, the dispatch block 640 is located in a weather protected zone within the building, and the user end 680 is distributed within the dwelling units.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A signal transport and distribution system serving users with internet and satellite television services comprising:
   in a multi-dwelling building, a DBS end, a dispatch block, and a user end;
   the dispatch block interconnecting the DBS end and the user end;
   an internet service provider passive optical network interconnected with the dispatch block via an OLT;
   in the dispatch block a switch for receiving DBS signals via plural coaxial cables interconnected with a DBS low noise block;
   the switch configured to simultaneously deliver multiple channels of multimedia content at a switch coaxial output port in response to requests received from a plurality of set top boxes;
   a splitter that uses y output ports to couple the switch coaxial output to each of y dispatch block transceivers;
   in each of y dwelling units a dwelling unit transceiver having a coaxial port and two optical ports;
   a coaxial cable interconnecting the transceiver and a single or multiple tuner set top box;
   an optical cable interconnecting the transceiver and an ONU; and,
   for each dispatch block transceiver, a single mode fiber optic cable interconnecting the transceiver with a respective dwelling unit transceiver;
   wherein dwelling units simultaneously receive content of their choice as requested via their respective set top boxes and simultaneously exchange data with a public network.

2. The system of claim 1 wherein each of the dispatch block and user end transceiver pairs utilizes diplexers to route bidirectional control signals exchanged between an associated set top box and switch.

3. The system of claim 2 wherein each of the dispatch block and user end transceiver pairs utilizes telephone hybrid transformers to route bidirectional control signals exchanged between an associated set top box and the switch.

4. A communications system comprising:
   a switch, an OLT, set top box, and an ONU;
   the set top box sending RF control signals, the signals converted from RF at 2.1 to 2.5 MHz to light at a first wavelength, transmitted on a single mode fiber optic cable, converted to RF at 2.1 to 2.5 MHz, and received by the switch;
   the switch sending RF control signals, the signals converted from RF at 2.1 to 2.5 MHz to light as a second wavelength, transmitted on the single mode fiber optic cable, converted to RF at 2.1 to 2.5 MHz, and received by the set top box;
   the switch sending RF video signals, the signals converted from RF at 950 MHz to 2150 MHz to light at a third wavelength, transmitted on the single mode fiber optic cable, converted to RF at 950 to 2150 MHz, and received by the set top box;
   the OLT sending signals to the ONU using light as a fourth wavelength; and,
   the ONU sending signals to the OLT using light as a fifth wavelength.

* * * * *